US012583655B2

(12) United States Patent
Zilic

(10) Patent No.: US 12,583,655 B2
(45) Date of Patent: Mar. 24, 2026

(54) FILL PORT WITH CRYOGENIC SEAL

(71) Applicant: Honeywell International Inc., Charlotte, NC (US)

(72) Inventor: Kyle Zilic, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 102 days.

(21) Appl. No.: 18/590,382

(22) Filed: Feb. 28, 2024

(65) Prior Publication Data

US 2025/0270012 A1 Aug. 28, 2025

(51) Int. Cl.
*B65D 53/02* (2006.01)
*A61J 1/14* (2023.01)

(52) U.S. Cl.
CPC ............ *B65D 53/02* (2013.01); *A61J 1/1475* (2013.01); *F17C 2223/0161* (2013.01)

(58) Field of Classification Search
CPC ....... F16K 2200/401; Y10T 137/86348; F17C 13/04; F17C 2223/0161; A61J 1/1475
See application file for complete search history.

(56) References Cited

U.S. PATENT DOCUMENTS 4,658,871 A 4/1987 Gendey et al.
11,807,433 B2 11/2023 Kaminski et al.
2006/0021657 A1* 2/2006 Cherfane ............. G05D 7/0133 137/504
2009/0108224 A1* 4/2009 Clasen .................... F16K 3/085 251/315.1
2020/0149654 A1* 5/2020 Cao ......................... F16K 39/02
2022/0252197 A1* 8/2022 Zilic ........................ F16L 23/20
2024/0426387 A1* 12/2024 Zhang ..................... F17C 13/04

FOREIGN PATENT DOCUMENTS

DE 3604863 A1 9/1986
FR 2835038 B1 11/2006

OTHER PUBLICATIONS

Search Report and Written Opinion for EP25160374.2 dated Jul. 9, 2025.

* cited by examiner

*Primary Examiner* — Shawn M Braden
(74) *Attorney, Agent, or Firm* — Paschall & Associates, LLC; James C. Paschall; Anthony Miologos

(57) ABSTRACT

A fill port and apparatus for a cryogenic container includes a static gland having an internal cavity and a cryogenic seal surrounding an outlet, the outlet connected to the cryogenic container. A mechanical gland connected to a source of cryogenic fluid is sealingly positioned in the cavity of the static gland. The mechanical gland is arranged to be positionable within the static gland into a fill, or alternately, a seal position wherein in the fill position, cryogenic fluid flows through the mechanical gland into the cryogenic container through the outlet. Positioning the mechanical gland in the seal position causes the mechanical gland to engage the cryogenic seal isolating the cryogenic container from the outlet.

20 Claims, 5 Drawing Sheets

FILL PORT WITH CRYOGENIC SEAL

GOVERNMENT INTEREST

This invention was made with U.S. Government support. The U.S. Government may have certain rights in the invention.

TECHNICAL FIELD

This disclosure is generally directed to an apparatus for cryogenic containers. More specifically, it relates to a fill port having a cryogenic seal used in filling cryogenic containers.

BACKGROUND

The application of cryogenic technology typically utilizes self-pressurizing cylinders to dispense either gas or liquid to charge cryogenic containers used in various applications in industry, such as for example, gas storage vessels, one-shot cryogenic pots, and certain cryogenically cooled heat switches, or for charging portable liquid oxygen flasks used in the medical arts for portable oxygen therapy. Filling a cryogen container may require two connections associated with the filling process, an inlet or fill port and an outlet vent. The cryogen gas is loaded into a container through the inlet port through a coupling while the outlet vent is left open allowing any liquefied gas which returns to a gaseous form to vent to the atmosphere. In a typical method, once a cryogenic container is filled the coupling is removed and the fill port and vent sealed using any suitable method for the cryogenic environment, such as for example, non-reversible joinery or metal deformation.

It is accordingly an object of the present invention to provide an apparatus that can be used as a fill port for cryogenic containers.

It is another object of the present invention to provide a fill port for cryogenic containers that includes a suitable cryogenic seal for sealing the container when the container is filled, and which cryogenic seal can be user manipulated to be undone for refilling the container.

SUMMARY

This disclosure relates to a fill port having a cryogenic seal used in filling cryogenic containers.

In a first embodiment, a fill port for a cryogenic container is disclosed comprising a static gland having an internal cavity and a cryogenic seal surrounding an outlet, the outlet connected to the cryogenic container. A mechanical gland connected to a source of cryogenic fluid is sealingly positioned in the cavity of the static gland. The mechanical gland is arranged to be positionable within the static gland into a fill, or alternately, a seal position wherein in the fill position, cryogenic fluid flows through the mechanical gland into the cryogenic container through the outlet. Positioning the mechanical gland in the seal position causes the mechanical gland to engage the cryogenic seal isolating the cryogenic container from the outlet.

In a second embodiment, an apparatus for filling and sealing a cryogenic container is disclosed comprising a static gland having a cylindrical exterior wall having screw threads formed on the static gland exterior wall and an internal cavity having a cryogenic seal surrounding an outlet, the outlet connected to the cryogenic container. A mechanical gland having a fill tube is connected to a source of cryogenic fluid and a portion of the mechanical gland is sealingly positioned in the cavity of the static gland. A tightening nut has an interior space defined by a cylindrical interior wall that has screw threads formed on the interior wall and an opening located on a top surface of the tightening nut, wherein the fill tube extends through the opening placing another portion of the mechanical gland in the tightening nut interior space. The tightening nut is arranged to be rotated in a first direction to engage the tightening nut screw threads to the static gland screw threads and position the static gland into a fill position wherein, cryogenic fluid flows through the mechanical gland into the outlet and the cryogenic container. The tightening nut is further arranged to place the apparatus into a seal position by further rotating the tightening nut in the first direction to engage a further amount of static gland screw threads causing the mechanical gland to engage the cryogenic seal and isolating the cryogenic container from the outlet.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The fill port of the present disclosure is comprised of a static gland having an internal cavity leading to an outlet that fluidically connects the cavity and the outlet to a cryogenic container such as for example, a gas storage vessel or a one-shot cryogenic pot. A floor in the static gland includes a cryogenic seal surrounding the outlet. A mechanical gland is positioned in the cavity of the static gland and arranged to be movable within the static gland between a fill position and a seal position. The mechanical gland includes an inlet tube connected to a source of cryogenic fluid on one end of the inlet tube and to a set of openings on another end of the tube. The openings extend to a ceiling of the mechanical gland. A set of quasi-static O-rings are placed between the mechanical gland and an internal wall of the static gland cavity that temporarily isolates the cryogenic container connected to the static gland from the outside environment.

In the fill position cryogenic fluid is introduced from the source of cryogenic fluid into the inlet tube of the mechanical gland. The cryogenic fluid flows through the inlet tube and out of the openings into a void space defined by the ceiling of the mechanical gland and the floor of the static gland. In the fill position, the cryogenic fluid introduced into the void space exits the static gland through the outlet to the cryogenic container. When the cryogenic container is filled, the mechanical gland is moved from the fill position to a seal position that places the ceiling of the mechanical gland on the floor of the static gland eliminating the void space and causing the closure of the cryogenic seal and creating a cryogenic seal between the fill port and the cryogenic container.

The cryogenic seal may be broken by moving the mechanical gland to the fill position, whereby the mechanical gland ceiling disengages from the static gland floor breaking the cryogenic seal.

Figure 1:
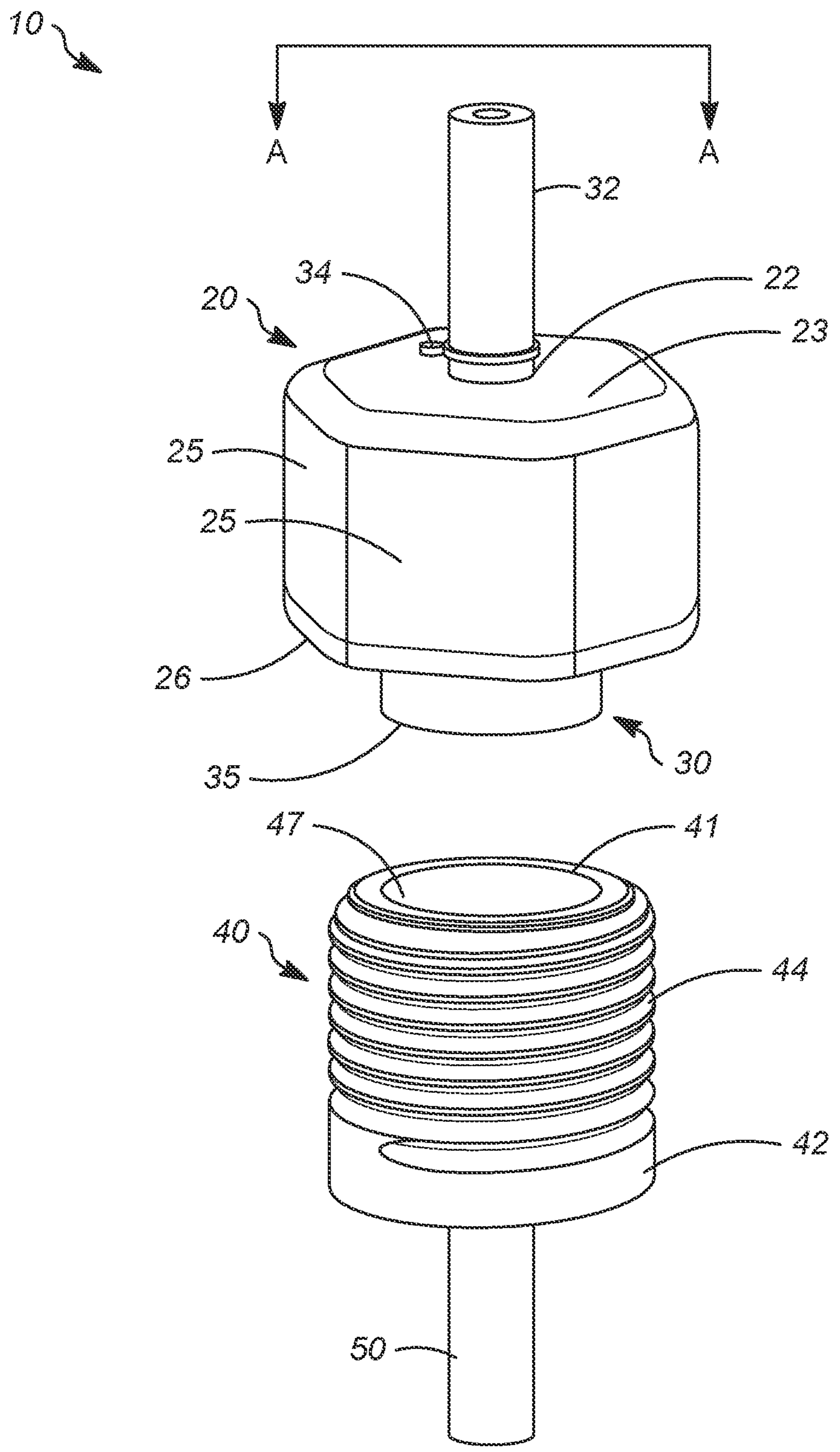
FIG. 1 is an isometric view of an example disassembled fill port in accordance with the present disclosure.
Figure 2:
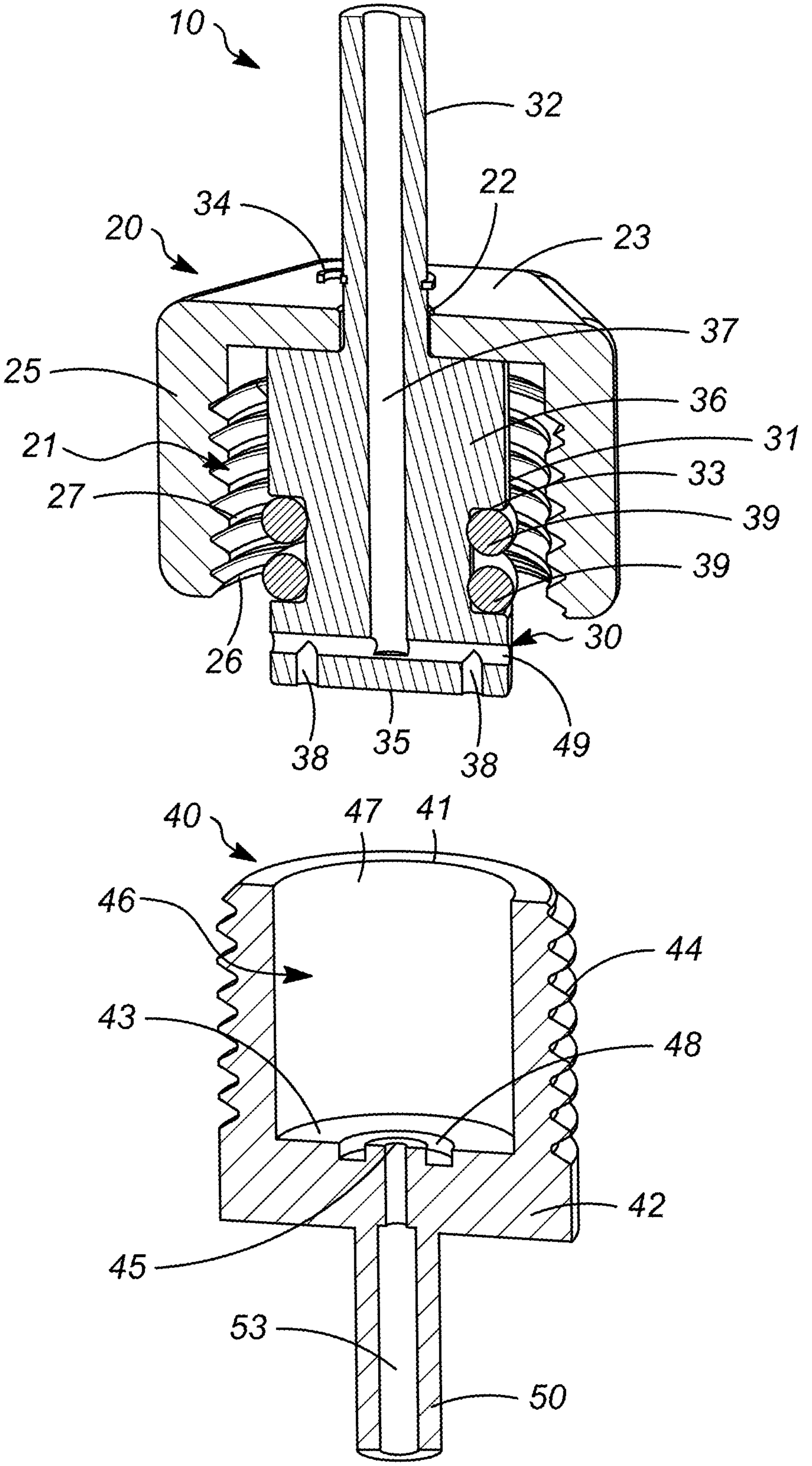
FIG. 2 is an isometric sectional view taken along line A-A of the example disassembled fill port of FIG. 1.
Figure 3:
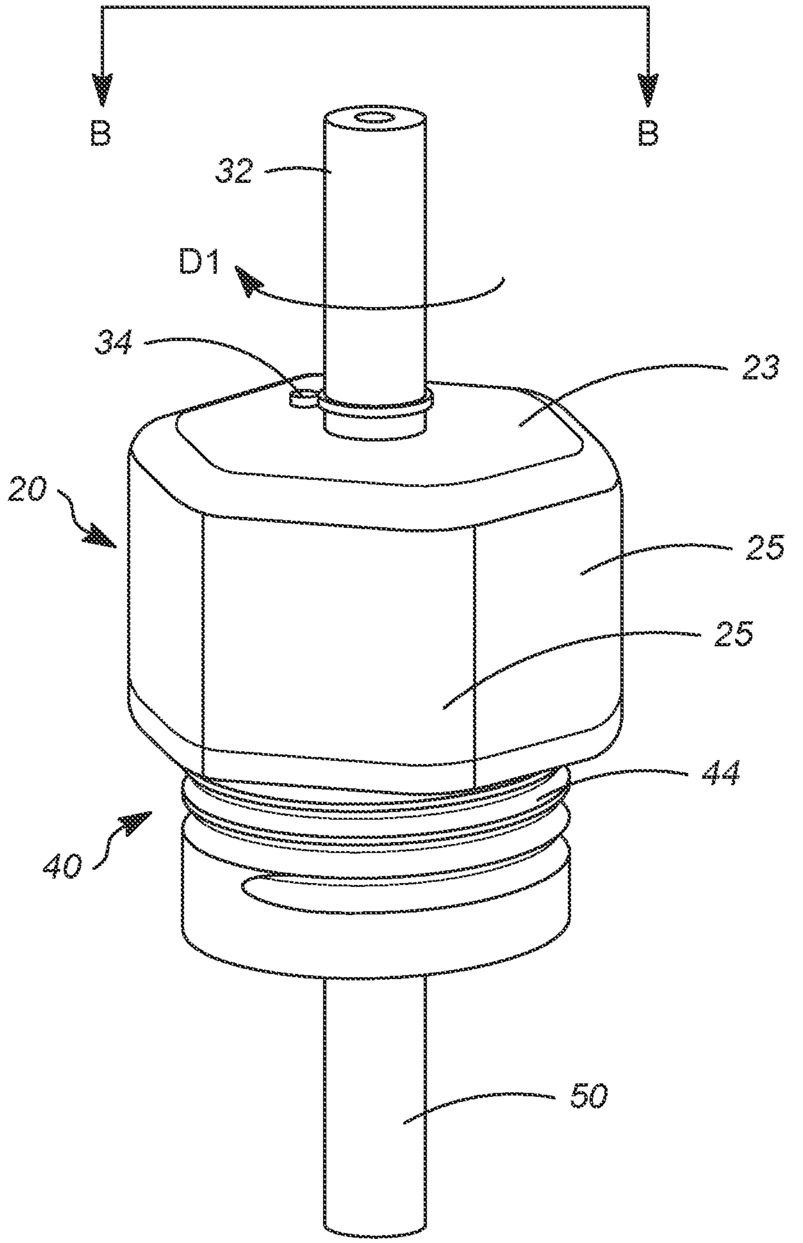
FIG. 3 is an isometric view of an example assembled fill port in a accordance with the present disclosure.

With reference to FIGS. 1-3 of the included drawings, an example fill port 10 of the present disclosure is illustrated. The fill port 10 is comprised of a tightening nut 20, a mechanical gland 30 and a static gland 40. A fill tube 32 extends from the mechanical gland 30 through an opening 22 located on a top surface 23 of the tightening nut 20. A retaining ring 34 is installed on the fill tube 32 using any convenient method. The retaining ring allows the tightening nut 20 to force the mechanical gland 30 to break the cryogenic seal when the tightening nut 20 is backed out, which will be explained in detail later.

The tightening nut 20 has a generally hexagonal exterior shape comprised of walls 25, extending between an opening 26 and the top surface 23. The walls 25 are adapted to accept various tools such as for example, a wrench or a pair of pliers to turn the tightening nut 20. The hexagonal exterior form of the tightening nut 20 is illustrated herein as one example of a multi-sided form that can be used with a tool. It will be obvious to those skilled in the art that other multi-sided forms such as for example quadrilateral, or octagonal sided forms can be used to form the exterior walls 25 of the tightening nut 20. An interior space 21 is defined by a cylindrical interior wall having screw threads 27 formed on the interior wall.

As is best seen in the sectional view of FIG. 2, taken along line A-A of FIG. 1, the mechanical gland 30 comprises a cylindrical body 36 having the fill tube 32 extending from as first end of the body 36. A passage 37 extends through the fill tube 32 and the body 36 terminating at a hollow 49 in the interior of the body 36. A pair of holes 38 extend from the hollow 49 to a ceiling 35 formed on a second end of the body 36. A channel 33 is formed about the exterior surface 31 of the body 36. A pair of O-rings 39 are arranged to be installed in the channel 33.

The static gland 40 is cylindrical in shape and has an opening 41 on one end of the static gland 40 and a base portion 42 on an opposite end from the opening 41. A cylindrical exterior wall of the static gland 40 includes screw threads 44 extending from the opening 41 to the base 42. The threaded exterior wall of the static gland 40 has a diameter that is complimentary to the screw threads 27 of the tightening nut 20 and is arranged to have the screw threads 27 of the tightening nut 20 engage the screw threads 44 of the static gland 40 as shown in FIG. 3. The opening 41 of static gland 40 leads to a cavity 46 defined between an interior cylindrical wall 47. The cavity 46 is arranged to accept the body 36 of the mechanical gland 30 therein. The diameter of the opening 41 and therefore the interior wall 47 has a diameter slightly larger than the exterior wall 31 of the mechanical gland 30.

A floor 43 is located in the cavity 46 on an opposite end of the opening 41. An outlet 45 extends from the floor 43 to an outlet tube 50. A groove 48 is formed around the outlet 45 adapted to accept and retain within the groove 48 an iridium sealing wire (not shown). It should be noted that the present disclosure will be explained using an iridium wire cryogenic seal. It will be appreciated by those skilled in the art that other cryogenic seals may be used to form the cryogenic seal, such as for example, a metal gasket seal, having knife-edge or round cross-section gasket-deforming features.

The tightening nut 20, mechanical gland 30, inlet tube 32 and static gland 40 and outlet tube 50, may be constructed from a metal material such as, for example, a stainless steel or other metal material used in cryogenic applications.

Figure 4:
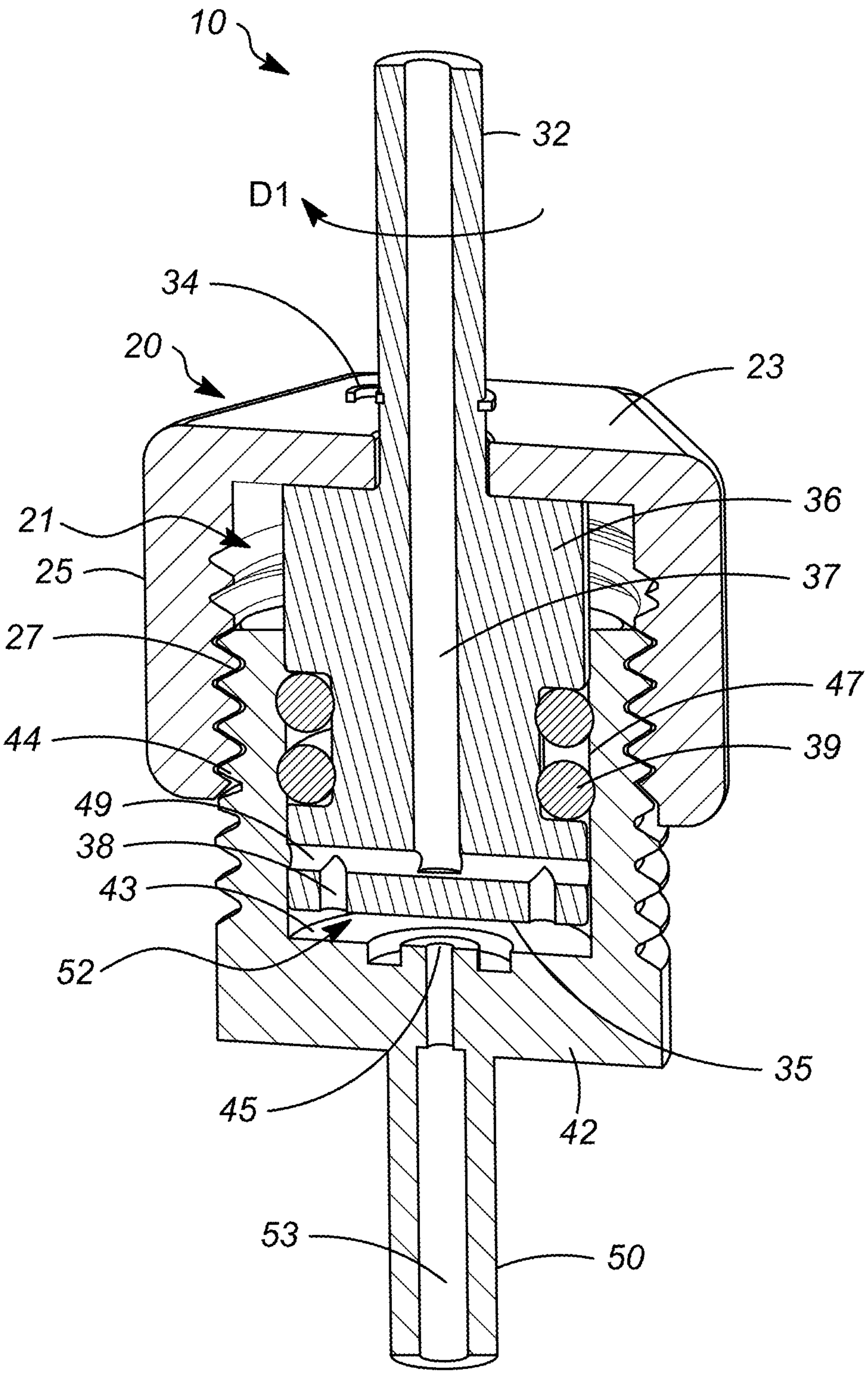
FIG. 4 is an isometric sectional view taken along line B-B of FIG. 3 in a fill position, in a accordance with the present disclosure.
Figure 5:
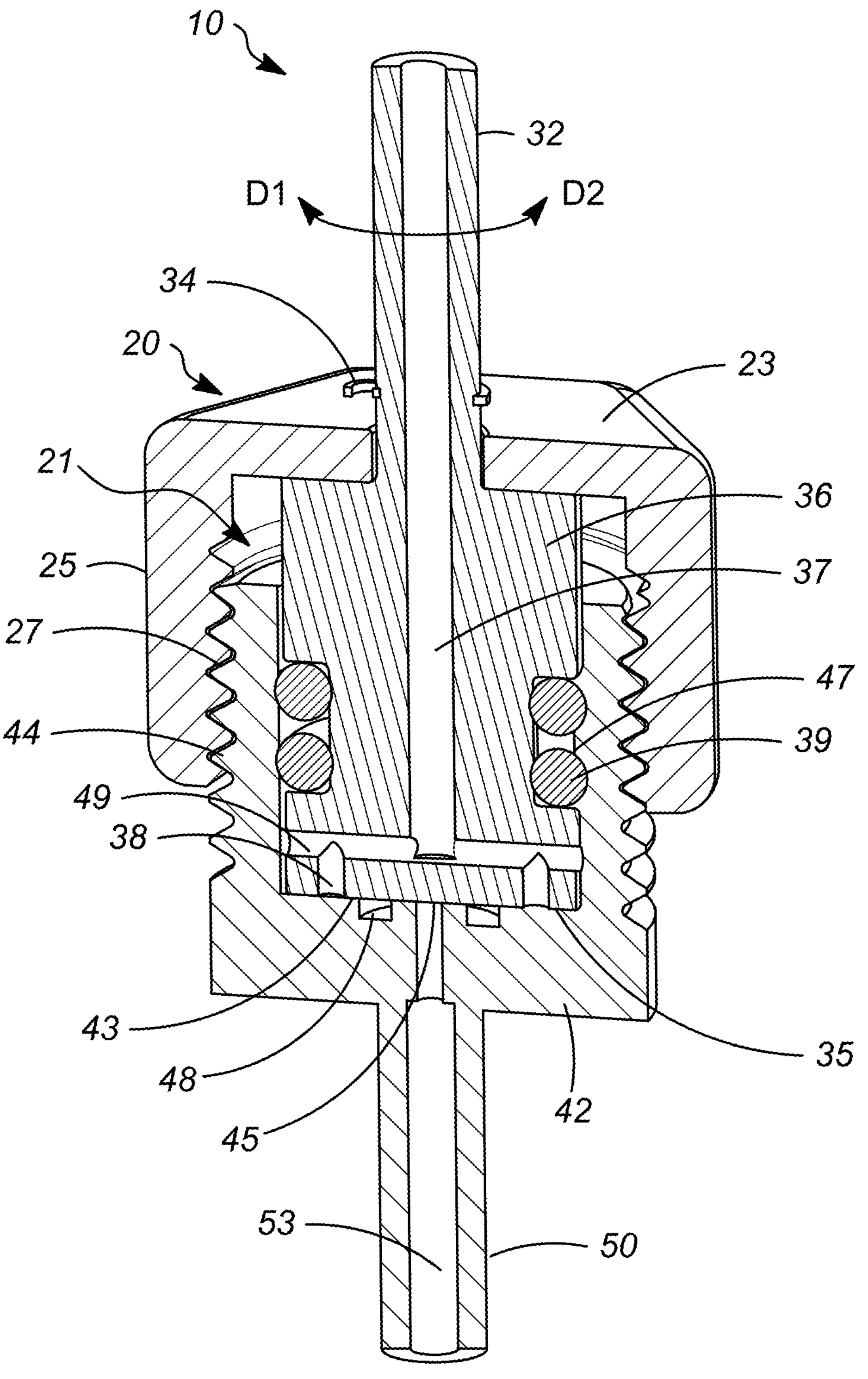
FIG. 5 is an isometric sectional view taken along line B-B of FIG. 3 in a seal position, in a accordance with the present disclosure.

With additional reference now to FIGS. 4 and 5 a sectional view of the assembled fill port 10 is illustrated along section line B-B of FIG. 3. The mechanical gland 30 is arranged to be installed within opening 41 of the static gland 40 and into cavity 46. When installed within the static gland 40, the mechanical gland 30 is movable between a first fill position and a second seal position. FIG. 4 illustrates the fill position of the fill port 10.

Before the mechanical gland 30 is installed in the static gland 40, an iridium wire (not shown) is placed in groove 48. The mechanical gland 40 is then installed through opening 41 into the cavity 46 of the static gland 40. The screw threads 27 of the tightening nut 20 are engaged to the screw threads 44 of the static gland 40. The tightening nut is next tightened turned clockwise in the direction of arrow D1 until O-rings 39 contact the interior wall 47 of the static gland 40 causing the O-rings 39 to quasi-statically seal the cavity 46. In the fill position, a void space 52 is formed between the ceiling 35 of mechanical gland 30 and the floor 43 of the static gland 40.

The outlet tube 50 is attached to a cryogenic container (not shown), such as for example, a gas storage vessel or a one-shot cryogenic pot using any convenient method known to make a cryogenic connection. The cryogenic connection can be semi-permanent using a removable cryogenic connector or permanently fixed connection, such as for example welding the outlet tube 50 to the cryogenic container. The fill tube 32 is next coupled to a cryogenic fill system (not shown) using any currently known method for connecting to a source of cryogenic fluid. The cryogenic fill system is first operated to evacuate any air in the fill tube 32, outlet tubes 50 and the void space 52. The O-rings 39 form floating seals between the mechanical gland 30 and the static gland 40, provide isolation of the gland cavity 46 from the outside environment. Once the outside air is evacuated, cryogenic fluid is introduced into body 36 by the inlet tube 32 and passage 37 into hollow 49 where it is expelled through holes 38 and into the void space 52. The cryogenic fluid then enters outlet 45 and travels along passage 53 of outlet tube 50 to the attached cryogenic container.

When the cryogenic container is filled, the tightening nut 20 is engaged and turned clockwise in direction D1 to urge the mechanical gland 30 to travel downward to place the ceiling 35 on the floor 43 of the static gland 40. Continued clockwise rotation in direction D1 of the tightening nut 20 urges ceiling 35 against floor 43, sealing against the iridium wire and forming a cryogenic seal around opening 45. The source of cryogenic fluid and the fill system can then be disengaged from the fill tube 32, leaving the fill port 10 attached to the cryogenic container.

The cryogenic seal established by mechanical gland 30, can be broken and the cryogenic container refilled by turning the tightening nut 20 counterclockwise in direction D2, loosening the tightening nut 20 and moving the tightening nut upwards toward the retaining ring 34. As the tightening nut 20 is further turned counterclockwise in direction D2, the top surface 32 of the tightening nut 20 engages the retaining ring 34. Furter counterclockwise rotation of the tightening nut 20 will cause the tightening nut 20 to apply a mechanical force on the retaining ring 34 that moves the body 36 upward causing the ceiling 35 to disengage from the floor 43 and breaking the cryogenic seal. The mechanical gland 30 can then be removed from the static gland. 40. The fill port 10 can again be used to refill the cryogenic container after a new iridium seal wire is installed in groove 48 and the mechanical gland 30 installed into the static gland 40 as was previously explained above.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A fill port for a cryogenic container comprising:

a static gland having an internal cavity and a cryogenic seal surrounding an outlet, the outlet connected to the cryogenic container; and a mechanical gland connected to a source of cryogenic fluid sealingly positioned in the cavity of the static gland, the mechanical gland arranged to be positionable within the static gland between a fill position wherein cryogenic fluid flows through the mechanical gland into the cryogenic container through the outlet and a seal position wherein the mechanical gland engages the cryogenic seal isolating the cryogenic container from the outlet and wherein the mechanical gland includes a fill tube connected to the source of cryogenic fluid and to a set of openings, the openings extending through a ceiling of the mechanical gland.

2. The fill port of claim 1, wherein the outlet and the cryogenic seal are located on a floor of the static gland.

3. The fill port of claim 1, wherein the mechanical gland further includes at least one quasi-static O-ring located in a channel formed along an external surface of the mechanical gland, the O-ring sealing against an internal wall of the static gland.

4. The fill port of claim 2, wherein the floor of the static gland includes a groove surrounding the outlet and the cryogenic seal is an iridium wire placed in the groove.

5. The fill port of claim 1, wherein the static gland includes an outlet tube, the outlet tube fluidically connecting the outlet to the cryogenic container.

6. The fill port of claim 1, wherein the static gland includes a cylindrical exterior wall having screw threads formed on the static gland exterior wall.

7. The fill port of claim 6, wherein the fill port further includes a tightening nut comprising:

an interior space defined by a cylindrical interior wall having screw threads formed on the interior wall; and a multi-sided exterior wall and a top surface, the top surface including an opening, wherein the mechanical gland is housed in the tightening nut interior space and the fill tube extends through the opening.

8. The fill port of claim 7, wherein the fill tube includes a retaining ring attached to the fill tube located over the tightening nut top surface.

9. The fill port of claim 7, wherein in the fill position the tightening nut screw threads are rotated in a first direction to engage a set amount of the static gland screw threads that places the mechanical gland in the static gland cavity in a location that forms a void space between the static gland floor and the mechanical gland ceiling wherein cryogenic fluid flows through the mechanical gland through the openings into the void space and into the outlet.

10. The fill port of claim 9, wherein in the seal position the tightening nut screw threads are further rotated in a first direction to engage a further amount of static gland screw threads placing the mechanical gland ceiling against the static gland floor and over the iridium wire forming the cryogenic seal and isolating the cryogenic container from the outlet.

11. An apparatus for filling a cryogenic container comprising:

a static gland having a cylindrical exterior wall having screw threads formed on the static gland exterior wall and an internal cavity having a cryogenic seal surrounding an outlet, the outlet connected to the cryogenic container;

a mechanical gland having a fill tube connected to a source of cryogenic fluid, the mechanical gland includes a portion of the mechanical gland sealingly positioned in the cavity of the static gland; and a tightening nut having an interior space defined by a cylindrical interior wall that has screw threads formed on the interior wall and an opening located on a top surface of the tightening nut, wherein the fill tube extends through the opening, placing another portion of the mechanical gland in the tightening nut interior space, wherein the tightening nut is arranged to be rotated in a first direction to engage the tightening nut screw threads to the static gland screw threads and position the static gland into a fill position wherein cryogenic fluid flows through the mechanical gland into the outlet and the cryogenic container.

12. The apparatus of claim 11, wherein the outlet and the cryogenic seal are located on a floor of the static gland, the floor including a groove surrounding the outlet and an iridium wire placed in the groove.

13. The apparatus of claim 12, wherein the fill tube includes a passage extending through the mechanical gland to a set of openings that extend through a ceiling of the mechanical gland.

14. The apparatus of claim 11, wherein the mechanical gland further includes at least one quasi-static O-ring located in a channel formed along an external surface of the mechanical gland the O-ring sealing against an internal wall of the static gland and isolating the mechanical gland positioned in the static gland from the outside environment.

15. The apparatus of claim 11, wherein the static gland includes an outlet tube, the outlet tube fluidically connects the outlet to the cryogenic container.

16. The apparatus of claim 11, wherein the fill tube includes a retaining ring attached to the fill tube located over the tightening nut top surface.

17. The apparatus of claim 13, wherein in the fill position the tightening nut screw threads engage a set amount of the static gland screw threads that places the mechanical gland within the static gland cavity in a location that forms a void space between the static gland floor and the mechanical gland ceiling wherein cryogenic fluid flows through the mechanical gland passage through the openings into the void space and into the outlet.

18. The apparatus of claim 17, wherein the tightening nut is further manipulated to place the apparatus into a seal position by rotating the tightening nut in the first direction to engage a further amount of static gland screw threads and placing the mechanical gland ceiling against the static gland floor and over the iridium wire forming the cryogenic seal and isolating the cryogenic container from the outlet.

19. The apparatus of claim 16, wherein the cryogenic seal may be broken by rotating the tightening nut in a second direction to disengage a set amount of tightening nut screw threads from the static gland screw threads to place the mechanical gland in the fill position and the mechanical gland removed from the static gland by further rotating the tightening nut in the second direction until the tightening nut top cover engages the retaining ring, wherein further rotation of the tightening nut in the second direction causes the mechanical gland to be pulled from the static gland.

20. The apparatus of claim 18, wherein the source of the cryogenic fluid can be removed from the fill tube when the cryogenic seal is formed and the outlet of the static gland retained to the cryogenic container.

* * * * *